United States Patent [19]

Nishio et al.

[11] Patent Number: 4,906,509

[45] Date of Patent: Mar. 6, 1990

[54] TWO LAYERED REFRACTORY PLATE

[75] Inventors: Hideaki Nishio; Akira Matsuo, both of Okayama; Katsunori Ito; Keisuke Uemori, both of Bizen, all of Japan

[73] Assignee: Shinagawa Refractories Co., Ltd., Tokyo, Japan

[21] Appl. No.: 167,727

[22] Filed: Mar. 14, 1988

[30] Foreign Application Priority Data

Mar. 16, 1987 [JP] Japan .................................. 62-58740

[51] Int. Cl.$^4$ ................................................ B32B 5/02
[52] U.S. Cl. .................................... 428/148; 428/149; 428/150; 428/143
[58] Field of Search ............... 428/149, 150, 148, 325, 428/143

[56] References Cited

U.S. PATENT DOCUMENTS 2,327,972  8/1943  Stettinius et al. .................. 428/149
4,055,451  10/1977  Cockbain et al. .................. 428/325

Primary Examiner—Alexander S. Thomas
Attorney, Agent, or Firm—Oblon, Spivak, McClelland, Maier & Neustadt

[57] ABSTRACT

The present invention provides a two layered refractory plate consisting of a crack-resistant substrate with a grained surface layer embedded thereon. This two layered refractory plate is suitable for use as a shelf plate in a furnace in which the temperatures vary. Cracks due to thermal expansion differences in the material can be prevented.

1 Claim, 1 Drawing Sheet

TWO LAYERED REFRACTORY PLATE

BACKGROUND OF THE INVENTION

The present invention relates to a refractory plate which is used in the production by firing of refractories, fine ceramics, china and ceramics for electronic parts etc.

In the firing of the above described products, it is popular to use tool bricks called firing base or shelf plate. Hereinafter they will be referred to as shelf plate.

The properties that shelf plate are required to have are:

(1) No reaction with the product
(2) High crack resistance after repeated use
(Merit in cost saving)
(3) No deformation
(4) High heat efficiency, etc.

It is therefore necessary to select shelf plate material which is compatible with the quality of the fired products. As for the materials of shelf plate, oxides such as $Al_2O_3$—$SiO_2$, $Al_2O_3$ $ZrO_2$ and non-oxides such as SiC are the main materials at present, but there is no shelf plate which has all-round properties.

That is, $Al_2O_3$—$SiO_2$ shelf plate is limited in use because it may react with a product and may deform while firing. In the case of $Al_2O_3$ shelf plate, high temperature firing is necessary, so it is expensive and also it may react with certain products.

In the case of $ZrO_2$ shelf plate there is no reaction with product and no deformation occurs, but it has drawbacks such as being heavy to handle because of its high specific density, it is high priced, has low thermal conductivity and begins to crumble after repeated use due to structural brittleness caused by $ZrO_2$ transformation.

In the case of SiC, it is resistant to deformation but it needs expensive coating to prevent oxidation aging and reaction with products.

To solve the above described problems, in the case of producing $Al_2O_3$ shelf plate, a three layered shelf plate with a center layer of SiC having excellent creep resistance being sandwiched by two $Al_2O_3$ layers is being produced.

However a three layered shelf plate is expensive, and it is difficult to make three uniform layers. Furthermore after repeated use, cracks like peeling between layers may occur so it is not an effective solution for the above described problems.

Another conventional method, Japanese Utility Model Open No. 61-192300 (1986) discloses a ceramic sheet-lined refractory vessel, in which a ceramic sheet of 0.1 to 5.0 mm in thickness is lined onto an inner plane surface or back plane surface of a refractory vessel in single or double layers by pressing or pasting them together and then firing them to make an integrated refractory vessel.

However this ceramic sheet is made using a paper manufacturing method, and if a green ceramic sheet is applied to a refractory vessel it will shrink at least 15% near the firing temperature, and cracks will also appear in the ceramic sheet so it is difficult to use such sheets for a refractory vessel. Also, if a rigid sheet of fired material is used it is difficult to fit it to a refractory vessel to be used as a substrate and if it were to be successfully fit to a refractory vessel, cracks or peeling will occur between the sheet and the refractory vessel after repeated use at the practical temperatures due to the differences in thermal expansion between the ceramic sheet and refractory vessel.

Therefore it is difficult for such sheets to stand up to use as a shelf plate which goes through repeated temperature changes.

SUMMARY OF THE INVENTION

Accordingly the present invention presents a two layered refractory plate which consists of grain-like surface portion and a substrate.

The two layered refractory plate of the present invention is to be mainly used as a shelf plate for a firing furnace exposed to variable temperatures and in order to prevent the surface cracking and peeling due to the thermal expansion differences between the surface portion and substrate, one of the drawbacks of conventional two layered refractory plate, the present invention successfully arranges a grain-like surface portion to a refractory substrate. That is, the peeling and cracking etc. are prevented by the gaps arranged between grains which absorbs the thermal expansion differences between the grain-like surface portion and the substrate arising from the differences in materials thereof.

DETAILED DESCRIPTION OF THE INVENTION

Figure 1:
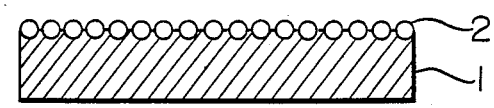
FIG. 1 shows a section of a two layered refractory plate of the present invention where 1 is a substrate and 2 is a grain-like surface portion.

The materials used for the refractory substrate of the present invention are not limited as far as they are stable to the temperature changes of a furnace, crack resistant, resistant to deformation, high in thermal conductivity and have a coefficient of linear expansion similar to that of the grain-like surface portion. Examples of such materials for the substrate are: magnesia, spinel (MgO.$Al_2O_3$), mullite, zirconia (e.g. natural baddeleyite, synthetic zirconia stabilized by MgO, CaO, $Y_2O_3$); zircon; silicon carbide, etc. Among them, magnesia-spinel and magnesia-spinel-zirconia refractory substrates are preferable as they show high durability. The substrates used for the two layered refractory plate of the present invention do not directly contact with the fired products, so there is no fear about reaction between the substrate and the product. Therefore, the purity of materials to be used for the substrate is not limited in particular and it is sufficient if grains can be embedded into the green substrate.

The grain-like surface portion of the two layered refractory plate of the present invention is the part which directly contacts with the product during firing, so it is necessary to use a high purity material taking into account the reaction etc. with the product.

Although the material of the grain-like surface portion depends upon the material of the product to be fired it is possible to use materials such as zirconia (e.g. natural baddeleyite, synthetic zirconia stabilized by MgO, CaO, $Y_2O_3$), silica, alumina, magnesia, spinel, silicon carbide, silicon nitride, carbon, etc.. Depending upon the quality of the product to be fired, it is possible to use one or more than one of the materials described above. The grain-like surface portion consists of the grains of the material described above.

The grains which be within a grain size range of from fine powder to coarse grain, preferably 0.1–2 mm can be used depending on the firing temperature when the two layered refractory plate is produced, adhesion strength with a substrate, temperature of the furnace, reactivity with the product, and the shape and dimension of the product. If the grain size is within the range described above, the thickness of the adhering portion is small, so any stress caused by the difference in thermal expansion between the grains and the substrate is easily absorbed. As a result, reductions in binding strength are small and no peeling between the grains and the substrate is observed.

As is clear from FIG. 1 which shows a section of a two layered refractory plate of the present invention, a part of the grains (2) is embedded into a substrate (1) and the grain-like surface consists of a layer of grains (2) disposed in a line on the substrate (1).

The grain-like surface portion having such a structure can be produced using various kinds of refractory production methods, such as uniformly covering a fixed shape green substrate soft enough for the grains to embed, with the above described grains and forming together etc. Then the green substrate having the grain-like surface portion is fired to obtain the two layered refractory plate of the present invention.

The firing temperature and firing time are not limited and can be varied according to the material of the substrate and grains, and the grain size range. However, it is necessary to fire at higher temperature than the working temperature of a furnace, the firing temperature usually being between 1,000°–1,600° C.

The firing temperature must not exceed the temperature at which all of the grains which constitute the grain-like surface portion fuse and turn into a glassy and dense surface. As the function and effect of the two layered refractory plate of the present invention is thought to be achieved as a result of the gaps between each grain of the grain-like surface portion, if all the grains fuse to become a glassy, and dense surface, the drawbacks would appear just like a conventional two layer structured refractory plate. However, even if there is some localized amount of grains fusing and densifying, it is possible to prevent peeling like cracking as long as some gaps still remain between the rest of the grains. Ideally, it is preferable that each grain is individually supported on the substrate. The melting temperature of each grain varies with the type and size of the material used.

Densification by fusion can be prevented by using grains of a uniform size. This is because if the grains which constitute the grain-like surface portion are not uniform in size, small grains get into the gaps between the larger grains and melt at a lower temperature, thus choking the gaps and densifying the grain-like surface portion.

The two layered refractory plate may have various combinations of substrate material and a grain-like surface portion material according to the expected use and for this reason the present invention has various merits in cost. For instance a conventional alumina shelf plate is fired at about 1800° C. to improve the creep resistibility, but according to the present invention it has become possible to lower the firing temperature to about 1600° C., that is, by using the alumina material for the grain-like surface portion only and highly creep resisant mullite for the substrate. Thus a shelf plate can be produced at lower cost.

Hereinafter, the present invention will illustrated by the following examples.

EXAMPLE

Samples of the present invention were made by charging the grains having a quality shown in the table 1, into a square metal mould having a dimension of 150×150×10 mm to obtain a level layer, and subsequently charging a dough compound for making a substrate having a quality shown in table 1 onto said grain layer, mono-axially pressing, demoulding and firing the green body at 1500° C.

TABLE 1

| | | | Example | | | | | | Comparison | |
|---|---|---|---|---|---|---|---|---|---|---|
| | 1 | 2 | 3 | 4 | 5 | 6 | 7 | 1 | 2 | 3 |
| Substrate | Alumina | Silicon Carbide | Magnesia-Spinel-Zirconia | Alumina-Mullite | Magnesia-Spinel-Zircon | Magnesia-Spinel-Zirconia | Alumina | Spinel | Single phase Zirconia | Single phase Alumina |
| Grain-like surface portion | Zirconia | Magnesia-Zirconia | Zirconia | Alumina-Spinel | Magnesia-Spinel | pichro-chromite | chrome-Oxide | Zirconia (plate) | — | — |
| Thickness of surface portion (mm) | 0.2 | 0.4 | 0.8 | 1.4 | 2.0 | 0.5 | 1.0 | 5.0 | — | — |
| Characteristics Anti-reactivity | good | good | good | good | good | good | good | good | good | standard |
| Crack resistance | good | good | good | good | good | good | good | bad | standard | good |
| Thermal efficiency | good | good | good | standard | standard | good | good | good | bad | standard |
| Price Index | 50 | 60 | 60 | 50 | 60 | 70 | 70 | 80 | 100 | 45 |

(1) Chemical composition of the materials used for the Examples and Comparisons were as follows.
Zirconia : $ZrO_2$ 95% (CaO-stabilized)
Magnesia : MgO 99.5%
Spinel : MgO 28.9 wt %, $Al_2O_3$ 69.9 wt %
Alumina : used for substrate $Al_2O_3$ 90%
   used for single plate (comparison) $Al_2O_3$ 90% used for grain-like surface portion $Al_2O_3$ 99%
Mullite : $Al_2O_3$ 72.8 wt %, $SiO_2$ 27.2 wt %
Silicon Carbide : SiC 98%
Zircon : $ZrO_2$ 67 wt %, $SiO_2$ 32 wt %
Picrochromite : MgO 81 wt %, $Cr_2O_3$ 18.5 wt %
Chrome Oxide $Cr_2O_3$ 99 wt %
(2) Mixing ratios
Example 2: Magnesia/Zirconia wt.ratio =1/1
Example 3: Magnesia/Spinel/Zirconia wt. ratio =10/5/1
Example 4 : Alumina/Mullite wt. ratio =1/1

Alumina/Spinel wt. ratio =1/2

Example 5: Magnesia/Spinel/Zircon wt. ratio =3/1/1

Magnesia/Spinel wt. ratio =1/1

In table 1, Examples 1 to 5 show two layered refractory plates of the present invention. Among these examples, Examples to 3 show especially good characteristics in anti-reactive, anti-cracking and thermal efficiency as they were able to adapt crack resistant, creep resistant and good heat efficient materials as a substrate and anti-reactive materials as a grain-like surface portion.

Examples 4 and 5 also show good results as well as moderate cost by using common materials for the substrates.

On the other hand Comparisons 1 to 3 show conventional products. Comparison 1 was made by combining two kinds of materials, one being crack resistant spinel as a substrate another being anti-reactive zirconia plate with a thickness of about 5 mm. Thus comparatively light weight refractory plate was made. However crack resistance was poor due to the thermal expansion difference of the two materials.

The present invention provides a two layered refractory plate consisting of a crack resistant substrate and an anti-reactive grain-like surface portion. Accordingly, the two layered refractory plate of the present invention has the characteristics of crack resistance and anti-reactivity at the same time which can not be rendered by a single phase refractory plate. The present invention also provides an improved process for making a refractory plate having good thermal efficiency and workability due to lighter weight in comparison with a single phased refractory plate made from zirconia.

What is claimed is:

1. A two layered refractory plate, which consists of:
a substrate formed of at least one material selected from the group consisting of magnesia, spinel, mullite, zirconia, zircon, alumina, chamotte, cordierite, silicon carbide and silicon nitride having thereon a granular surface composed of grains of a refractory material, which grains are spaced apart from each other thereby leaving gaps between said grains, said grains at least partially being embedded in said substrate and being formed of a material selected from the group consisting of magnesia, spinel, zirconia, alumina, silica, chromium oxide, silicon carbide, silicon nitride, carbon and picrochromite.

* * * * *

UNITED STATES PATENT AND TRADEMARK OFFICE
CERTIFICATE OF CORRECTION

PATENT NO.    :   4,906,509
DATED         :   MARCH 6, 1990
INVENTOR(S)  :   Hideaki NISHIO et al It is certified that error appears in the above-identified patent and that said Letters Patent is hereby corrected as shown below:

```
Column 1, line 50:   change "convential" to
                     -- conventional --.

Column 2, line 21:   change "absorbs" to -- absorb --.

Column 4, line 18:   change "will illustrated" to
                     -- will be illustrated --.

Column 5, line  7:   change "Examples to 3" to
                     -- Examples 1 to 3 --.
```

Signed and Sealed this

Eleventh Day of February, 1992

Attest:

HARRY F. MANBECK, JR.

*Attesting Officer*   Commissioner of Patents and Trademarks